(12) United States Patent
Bartz et al.

(10) Patent No.: US 7,376,935 B2
(45) Date of Patent: May 20, 2008

(54) DESIGN-TIME SYSTEM AND METHOD TO ENABLE PROGRAMMING ASSISTANCE ACROSS LANGUAGES AND COMPILATION BOUNDARIES

(75) Inventors: Bradley J. Bartz, Lynnwood, WA (US); William E. Hiebert, Redmond, WA (US); Ibrahim A. K. Mohamed, Redmond, WA (US); Evan G. Kichline, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 10/972,529

(22) Filed: Oct. 25, 2004

(65) Prior Publication Data

US 2006/0101373 A1    May 11, 2006

(51) Int. Cl.
 *G06F 9/44* (2006.01)
(52) U.S. Cl. ............... 717/110; 717/107; 717/101
(58) Field of Classification Search ............ None
 See application file for complete search history.

(56) References Cited

U.S. PATENT DOCUMENTS

| | | | |
|---|---|---|---|
| 6,799,718 B2 * | 10/2004 | Chan et al. ............. | 235/375 |
| 6,836,883 B1 * | 12/2004 | Abrams et al. .......... | 717/140 |
| 7,000,219 B2 * | 2/2006 | Barrett et al. ........... | 717/107 |
| 7,076,772 B2 * | 7/2006 | Zatloukal ................ | 717/147 |
| 2005/0108682 A1 * | 5/2005 | Piehler et al. .......... | 717/110 |
| 2006/0015857 A1 * | 1/2006 | Gold et al. ............. | 717/139 |

OTHER PUBLICATIONS

Jennifer Hamilton, "Language integration in the common language runtime", Feb. 2003, ACM Sigplan, vol. 38, Issue 2, pp. 19-28.*

* cited by examiner

*Primary Examiner*—Wei Zhen
*Assistant Examiner*—Chih-Ching Chow
(74) *Attorney, Agent, or Firm*—Amin, Turocy & Calvin, LLP

(57) ABSTRACT

The subject invention pertains to systems and methods to provide rich and intelligent programmatic assistance across language and compilation boundaries. In essence, the systems and methods can monitor a plurality of compilation units in a software project to determine the language(s) employed therewith and provide intelligent code assistance to the compilation units for the detected language(s). The rich and intelligent assistance can correspond to providing code suggestions, among other things, based on the programming language being utilized and the context of its use. In brief, the herein disclosed techniques provide a seamless design environment to facilitate coding in multiple programming languages amongst a plurality of compilation units in project.

26 Claims, 10 Drawing Sheets

DESIGN-TIME SYSTEM AND METHOD TO ENABLE PROGRAMMING ASSISTANCE ACROSS LANGUAGES AND COMPILATION BOUNDARIES

TECHNICAL FIELD

The present invention relates generally to computers and more particularly toward a framework supporting intelligent assistance across languages and compilation units.

BACKGROUND

Text or code editors are software programs specifically designed to facilitate source code specification and editing by programmers. Code editors (e.g., vi, emacs, notepad . . . ) provide functionality similar to word processors for receiving, modifying, and manipulating source code. Some code editors are very simplistic and text based while others can be quite complex and employ graphical user interface (GUI) technologies. In addition to code specification and editing, code editors can facilitate building and compiling programs. Although, text editors can be stand-alone programs, they are often incorporated into integrated development environments.

Integrated development environments (IDEs) (also referred to as integrated design environments, interactive development environments, and various combinations thereof) are conglomerates of programs that aid software development. Not only do IDEs include code editors, but they also typically include a compiler and/or interpreter as well as other tools like debuggers. This allows IDEs to be a complete software development and testing kit. These environments typically also employ visual programming techniques. Visual programming pertains to programming in part by using graphical interfaces and cutting, pasting, and/or modifying programmatic blocks to build programs. IDEs can also provide real-time programmatic assistance for particular programming languages to further aid program development. For example, suggestions can be made based on current programmatic entries, statements can be automatically completed, and the like.

However, there are several problems with conventional IDEs. In particular, most IDEs are limited to a single programming language per project. This forces programmers to utilize one language for all project tasks, rather than employing the best language for each respective task, for example, utilizing C# for an entire project or application. Furthermore, conventionally projects are typically compiled into only a signal unit. Thus, conventional technologies generally employ only a single language and compilation unit. In addition to the limitations on project development, intelligent assistance (e.g., programmatic suggestions, automatic statement completion . . . ) is limited to a single language project. Thus, even IDEs that support multiple languages force programmers to choose from utilizing a single programming language and compilation unit or alternatively experiencing limited or no intelligent assistance.

Accordingly, there is a need in the art for systems and methods to provide intelligent code assistance across multiple languages and compilation units in a project.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention concerns a system and method or framework for supporting design time intelligent coding assistance within and amongst multiple compilation units of numerous programming languages in a project. Rather than forcing a project to be compiled in a single compilation unit in a single language, the subject invention supports project(s) with both multiple compilation units and multiple compilation languages. According to one aspect of the invention, the compilation units can be web pages or portions thereof and the project can correspond to a web site application that includes numerous web pages.

According to one aspect of the invention, such objectives can be accomplished by a program management system that matches compilation units to particular assist provider components. Each compilation unit can be instantiated via at least a single programming or compilation language, and assist components can provide automated and intelligent coding assistance for particular programming languages (e.g., C#, VB, J#, JAVA® . . . ). Hence, to provide intelligent assistance to a compilation unit the language of the compilation unit can be matched with an assist component providing assistance for the same language.

The compilation unit language can be detected in a myriad of ways. In accordance with one aspect of the invention, the compilation unit language can be detected by a compiler during compilation or a portion thereof (e.g., parsing). In this case, the compiler can analyze compilation unit metadata (e.g., file extension, or language attribute) as well as the specific source code to determine the compilation language. According to another aspect of the invention, detection of the compilation unit language need not wait unit compilation. The language can be detected dynamically from the source code as entered or from metadata generated upon opening a new file.

According to an aspect of the invention, an assist provider can be located for a particular language. Assist providers can provide intelligent assistance for a particular programming language. The language associated with particular assist providers can be determined by analyzing a registration mechanism (e.g., a registry) or alternatively by analyzing a file in a particular location. Furthermore, the language related to an assist provider can be determined by simply querying the assist provider via an interface.

According to yet another aspect of the invention, upon detection of a new provider, the system can generate a project host component through which the system can route information to the assist providers. The host component can therefore provide an abstraction that an IDE project can use to communicate to arbitrary assist providers. Thus, according another aspect of the invention, a single host component can be employed by they system which can be associated with different assist providers at different times.

According to another aspect of the invention, the project host component and the assist provider component can include separate interfaces to facilitated communication there between. Specifically, the project host component can include a host interface that allows the assist provider component to retrieve information about the project and/or compilation units. Similarly, the assist provider component can include a provider interface that abstracts the provider functionality to enable the project management system to communicate with the assist provider.

According to another aspect of the invention, the project management system can include an asynchronous component to reduce initial delay times and provide assistance incrementally until all functions are loaded and available.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean "serving as an example, instance, or illustration." Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
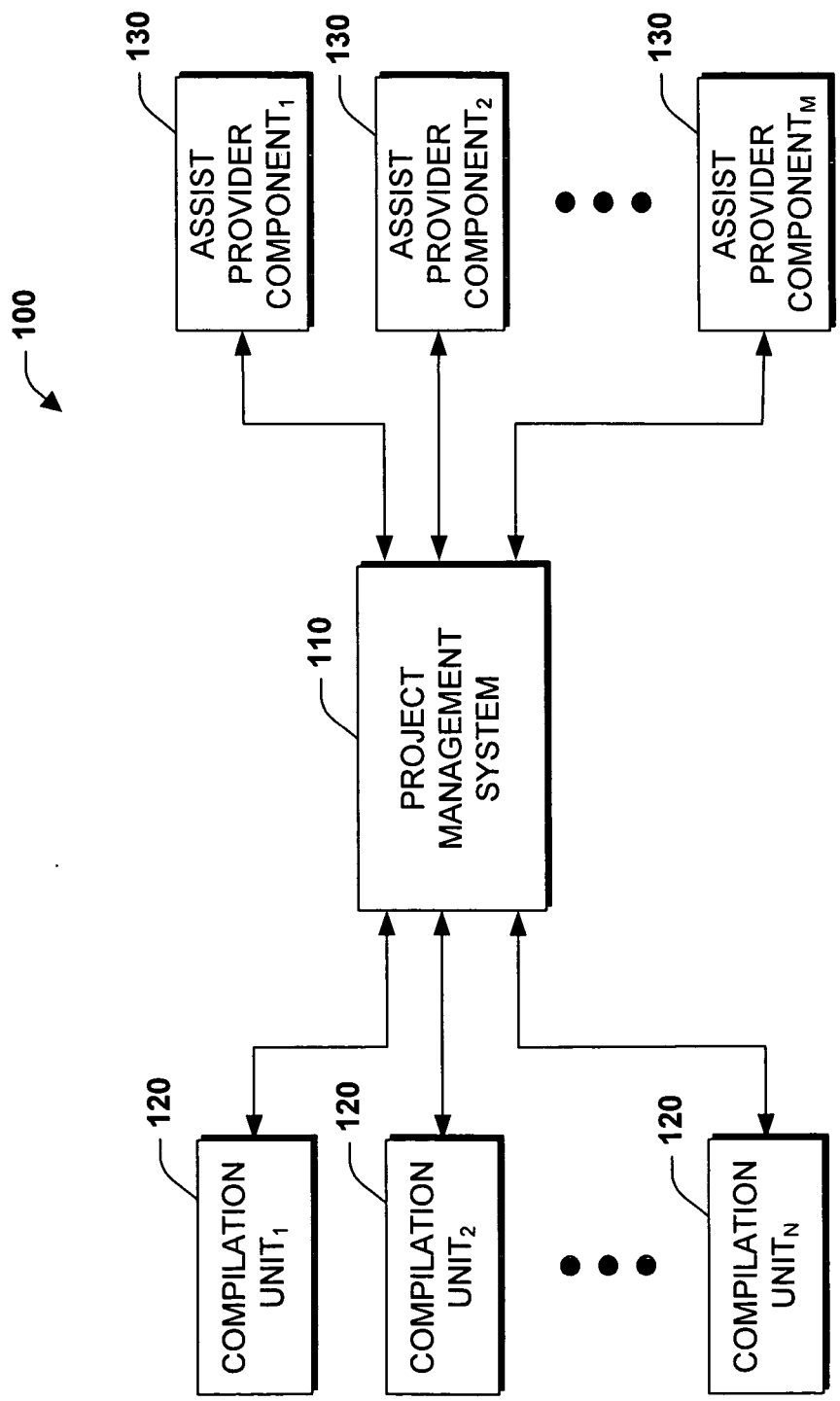
FIG. 1 is a block diagram of a project design system in accordance with an aspect of the subject invention.

Turning initially to FIG. 1, a project design system 100 is depicted in accordance with an aspect of the subject invention. Project design system 100 depicts at least a portion of an integrated design environment (IDE) (also known as an integrated development environment or interactive development environment). IDEs typically include but are not limited to editors, compilers and/or interpreters, debuggers, and various other automation components and graphical representations to aid programmers in software design. Project design system 100 includes project management system 110 (also referred to herein as simply project system), one or more compilation units or components 120, and one or more assist provider components 130. Project management system 110 interacts with both compilation units 120 and assist provider components 130. A compilation component includes a unit or segment of source code that is sufficiently complete to be compiled. However, the compilation unit 120 can also refer to a compiled or built assembly. A software project can include one or more compilation units 120. According to an aspect of the subject invention, compilation unit can be a source file. For example, a compilation unit 120 can be a web page that is part of a web site, the project. The compilation unit 120 could also be a code directory providing middle tier application logic. The assist provider component 130 supplies intelligent programmatic assistance (e.g., Intellisense®) for a particular programming language (e.g., Visual Basic, C#, C++, JAVA®, J# . . . ). Such assist provider components 130, therefore, can be provided by specific language development entities (e.g., software companies, universities, individuals . . . ). The assist provider component 130 can simplify coding, for example, aiding programmers in statement, class, and function completion by providing suggestions based on programmatic context. These suggestions can be provided via pop-up windows or boxes, drop-down windows, and the like. For example, suggestions can be made for completing a partially specified word or statement based on its previous specification in the same of different compilation unit 120. In another example, if a portion of a programmatic construct is specified then the subsequent portion can be suggested. For instance, if the "if" of an "if-then" statement is specified followed by a condition the "then" word can be suggested to aid in completion. In brief, the program management system 110 can match assist provider components 130 to appropriate compilation units 120, inter alia.

Figure 2:
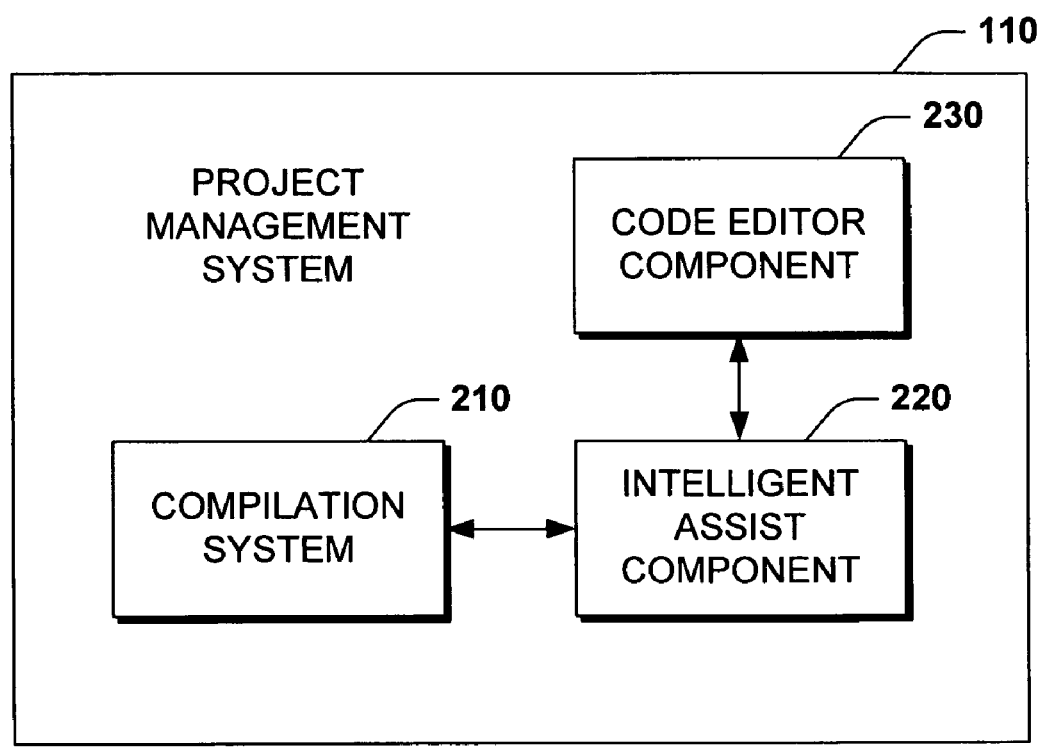
FIG. 2 is a block diagram of a project management system in accordance with an aspect of the subject invention.

Turning to FIG. 2, program management system 110 is illustrated in further detail. Project management system 110 can include a compilation system 210, an intelligent assist component 220, and a code editor component 230. The compilation system 210 can compile compilation units 120 (FIG. 1) as well as assist provider components 130 (FIG. 1). According to one aspect of the invention, the compilation system can dynamically compile compilation units 120 upon detection of a change following an action or gesture such as a save. Compiled files can then provide drastically increased execution speed. The compilation system 210 can also compile assist provider components 130. The compiled assembles can then be provided to other dependent assist provider component 130. In short, assist provider components 130 can depend on others. In some instances, assist provider components 130 can communicate amongst themselves. However, if they cannot or do not, then the project management component 110 can compile an assist provider component 130 and provide it to another dependent assist provider component 130 (as discussed in further detail infra). Intelligent assist component 220 enables programmatic assistance (e.g., Intellisense®) to be provided for one or more compilation units. In particular, intelligent assist component 220 may interact with code editor component 230. Code editor component 230 provides a source code specification and editing mechanism. For example, a programmer can manually specify code and/or cut and paste code blocks utilizing a graphical interface within the editor. Intelligent assist component 230 can provide real-time assistance to the code editor component 230 based on the source code language(s) operated thereon by the editor component 230. The intelligent assistance can be predictions or suggestions based on code context. For example, statements, functions, classes, etc., can be automatically completed.

Figure 3:
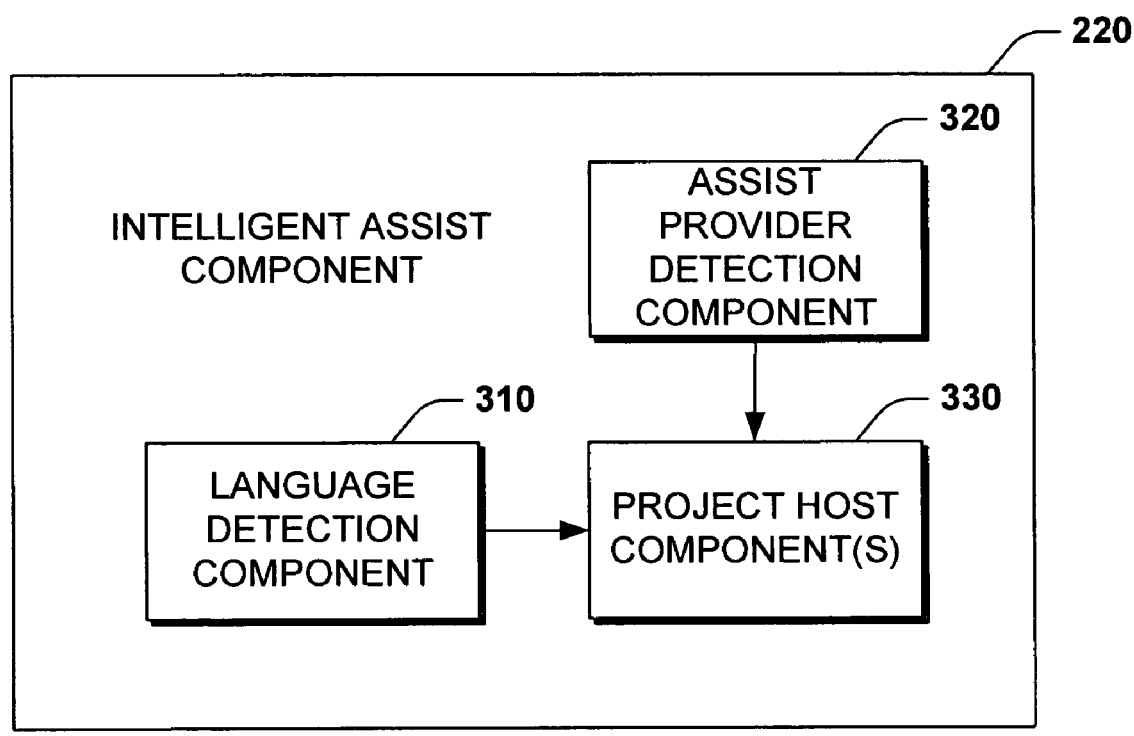
FIG. 3 illustrates a block diagram of an assist component in accordance with an aspect of the subject invention.

FIG. 3 depicts an intelligent assist component 220 in accordance with an aspect of the subject invention. Intelligent assist component 220 includes a language detection component 310, assist provider detection component 320, and project host component(s) 330. Language detection component 310 monitors compilation units 120 (FIG. 1) (e.g., files, web pages, code directories . . . ) to determine at least in part which programming language or languages are being employed therein. For example, prior to opening a file in a code editor a programmer may specify the language utilized. In a particular instance, a file can be opened with a particular extension (e.g., vb—visual basic, cs-C# . . . ). The language detection component 310 can identify such language. In addition, language detection component 310 can identify a language associated with a compilation unit upon opening or gesturing to open a compilation unit 120 for editing. Language can be identified based on the saved compilation unit type, metadata associated with the unit, and/or actual code contained within the unit. The language detection component 310 can also actively monitor a compilation unit 120 to detect a language(s) dynamically prior to compilation. For instance, the detection component 310 can identify a particular language based on the syntax of a compilation unit 120 and/or upon an explicit language declaration. Proper language assistance can then be provided in real-time. Furthermore, even though specifically identified as part of the intelligent assist component, language detection functionality can be provided additionally or alternatively by the compilation system 210 (FIG. 2) or a portion thereof. In such a scenario, programming language(s) can be detected upon compilation. Furthermore, it should be appreciated that language detection can be provided for referenced compilation units. In addition to actual languages specified and referenced in a compilation unit, language detection component 210 can also identify language(s) associated with a code directory that may be employed in conjunction with another compilation unit 120.

Assist provider detection component 320 is a mechanism that can detect the presence of available assist provider components 130. According to one aspect of the invention, assist providers 130 can be registered via a registration mechanism such as a central registry. By way of example, the following illustrates registration of an assist provider 130 for the C# language:

```
[HKEY_LOCAL_MACHINE\SOFTWARE\IDE\8.0\Languages\IntellisenseProviders\C
SharpCodeProvider]
"GUID"="{7D842D0C-FDD6-4e3b-9E21-0C263F4B6EC2}"
"DefaultExtension"=".cs"
"ShortLanguageName"="c#;cs;csharp"
"AddItemLanguageName"="C#"
"TemplateFolderName"="CSharp"
```

In this case, the provider detection component 320 can monitor the registry for new additions thereto. According to another aspect of the invention, assist providers 130 or references thereto can be stored to one or more particular file locations. Thus, the assist provider detection component can monitor the file location(s) to detect the presence of a new assist provider 130. It should be appreciated that there are many other manners of introducing and detecting the presence of assist providers than are described here, all of which fall within the scope of the subject invention. Upon identifying a new assist provider 130, provider detection component 320 can initiate creation of and/or associate a host provider component 330 with the new assist provider 130.

Project host component 330 hosts assist provider components in a project system. Project host component(s) 330 can be instantiated from a class in the project system and associated in a one-to-one relationship with assist provider components 130. In essence, the project host component 330 acts as a project wrapper for a third party assist provider 130. Accordingly, all requests for intelligent assistance from the project system (e.g., via the intelligent assistant component 220 and/or the compilation system 210 (FIG. 2)) can be routed through the project host component 330 associated with the appropriate assist provider component 130. Furthermore, all requests for project information from assist provider components 130 can be routed through respective project host components 330. Additionally, it should be appreciated that the project host component 330 can provide an abstraction that an IDE project can employ to communicate with arbitrary assist providers 130. This allows support for a situation where the language of a compilation unit 120 changes on the fly, for example, when a user changes the language attribute in a page or changes the files in a code directory. In such a scenario, the host the project system can maintain the interface project host component 330 and change the underlying assist provider associated therewith. Of course, the system can also simply utilize a different project host component 330 associated with the new language.

Figure 4:
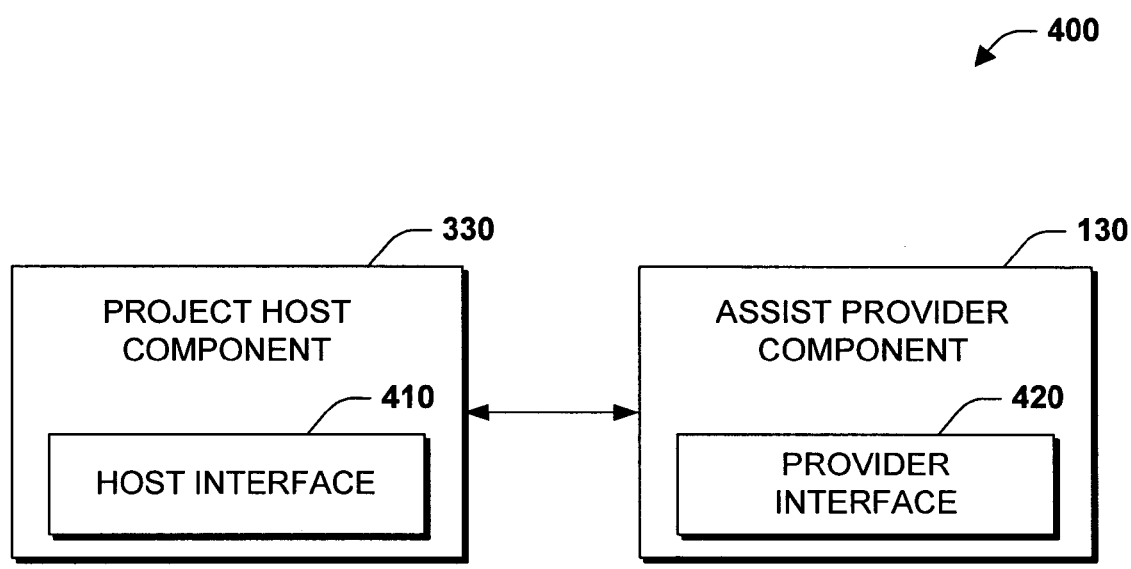
FIG. 4 is a block diagram of a project assist component interaction system in accordance with an aspect of the subject invention.

Turning to FIG. 4, a project assist component interaction system 400 is depicted in accordance with an aspect of the subject invention. System 400 illustrates one manner in which project host components 330 can interact with intelligent assist provider components 130. As described supra, the project host component 320 is a mechanism within a project management system 110 for supporting external and/or third party assist provider components 130. Assist provider components 130 provide for intelligent assistance relative to a particular compilation language. It should be noted that assist provider components 130 can provide intelligent assistance for conventional languages or those that have not yet been developed. Accordingly, it is necessary that a general framework, system 400, be specified to govern communications. Here, a project host component 330 can include or be associated with a host interface 410 and an assist provider component 130 can include or be associated with a provider interface 420.

Host interface 410 provides a mechanism that can be utilized by an assist provider component 130 for obtaining information about a project or compilation unit 120 (FIG. 1) from project host component 320. For example, host properties can be requested by an assist provider such as the project name, a pointer to a project hierarchy, a relative uniform resource locator (URL) of the project, and/or a file name that should be used to cache intelligent assistance information. An assist provider component 130 can also receive/retrieve compiler options from the interface 410. Further, an assist provider may receive/retrieve specific project information from the interface 410 including but not limited to whether the project or compilation unit is to generate an executable, whether the project is supposed to generate in memory, whether debugging information is to be included, and whether error warnings are to be treated as errors. The interface 410 can also provide data from a project or compilation unit name such as the name of the main class, user token, resource files, and/or the code model. Still further yet, the host interface 410 can provide a blocking command that can halt execution until the assist provider component 130 is ready.

Provider interface 420 can be provided and implemented by an assist provider component 130. Provider interface 420 supplies an abstraction through which project host components 330 communicate with various assist provider components 420. As can be appreciated, the provider interface 420 can provide abstraction for various necessary as well as optional functionalities. For example, the project host component may needs to link to an assist provider component 130 and release the assist provider component 130, for instance upon closing of a project. Furthermore, the project host 330 may need to be able to add and remove files or references thereto to a project and provide notice to the assist provider 130. Still further yet, the project host component 330 may need to be able to query the assist provider component to determine if it is compatible with a file or language. The provider interface 420 can also facilitate adding and removing references between providers. As mentioned supra, there may be times where assist provider components 130 are dependent upon other assist provider components 130. For example, in order for provider B to compile it must use provider A as a reference. The provider components 130 may support communication amongst themselves. According to an aspect of the invention, this provides for a better assist experience as users will be able to view changes from another assist provider immediately with out further action (e.g., saving). If they do, such communication should be allowed. Thus, the provider interface 420 should according to one aspect of the invention, support querying a provider component 130 to determine whether it supports communication with another provider component and also adding and removing references to other providers 130. If providers 130 are dependent and they do not support communications amongst themselves, then an assist provider component 130 can be compiled into assembly code and the assembly code can be added to another provider by reference, for instance. Accordingly, the provider interface 420 can support adding and removing assembly references to assist provider components 130. It should be appreciated that the aforementioned uses for a provider interface 420 are merely exemplary and provided as context to add clarity and understanding to the utilization of the subject invention. Other uses of the provider interface 420 and communications from the project host component 330 to the assist provider component 130 are both contemplated and within the scope of the invention.

Figure 5:
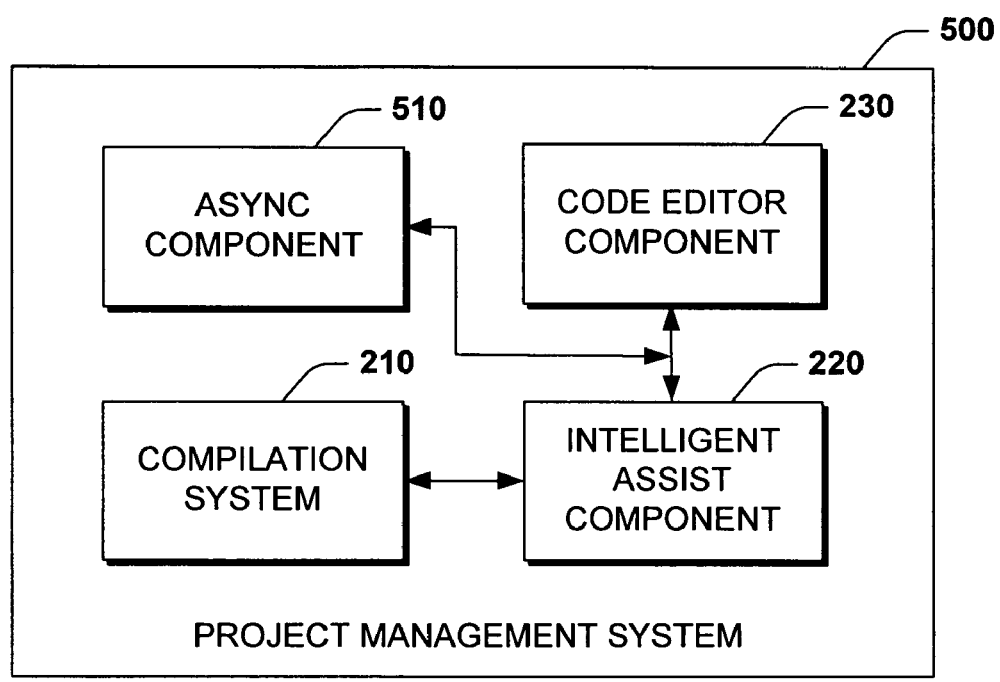
FIG. 5 is a block diagram for a project management system in accordance with an aspect of the subject invention.

FIG. 5 illustrates a program management system 500 in accordance with an aspect of the invention. Similar to program management system 110 system 550 can include a compiler system 210, intelligent assist component 220, and a code editor component 230. Code editor component 230 provides a mechanism for, inter alia, source code specification and editing. Intelligent assist component 220 can facilitate program specification by providing language specific predictions or suggestions based at least upon current program context. Compiler system 210 can compile source code specified in the code editor, among other things. Identifying compilation unit languages and making intelligent assistance available to code editor components 230 can be a high latency process. This can potentially cause a delay in the availability and/or responsiveness of an editor component (e.g., blocking user input). Accordingly, system 500 provides an asynchronous component 510 to mitigate and/or eliminated such delay. In essence, asynchronous component 510 coordinates dispatch of process requests and receipt of completion messages in an asynchronous manner behind the scenes and without user knowledge. As portions of intelligent assistance become available, they can be provided to the code editor component 230. Thus, a trade off can be made between initial delay and program hanging while the complete intelligent assistance is loaded and enabled, and eliminating such initial delay and merely delaying the full availability of intelligent assistance.

Figure 6:
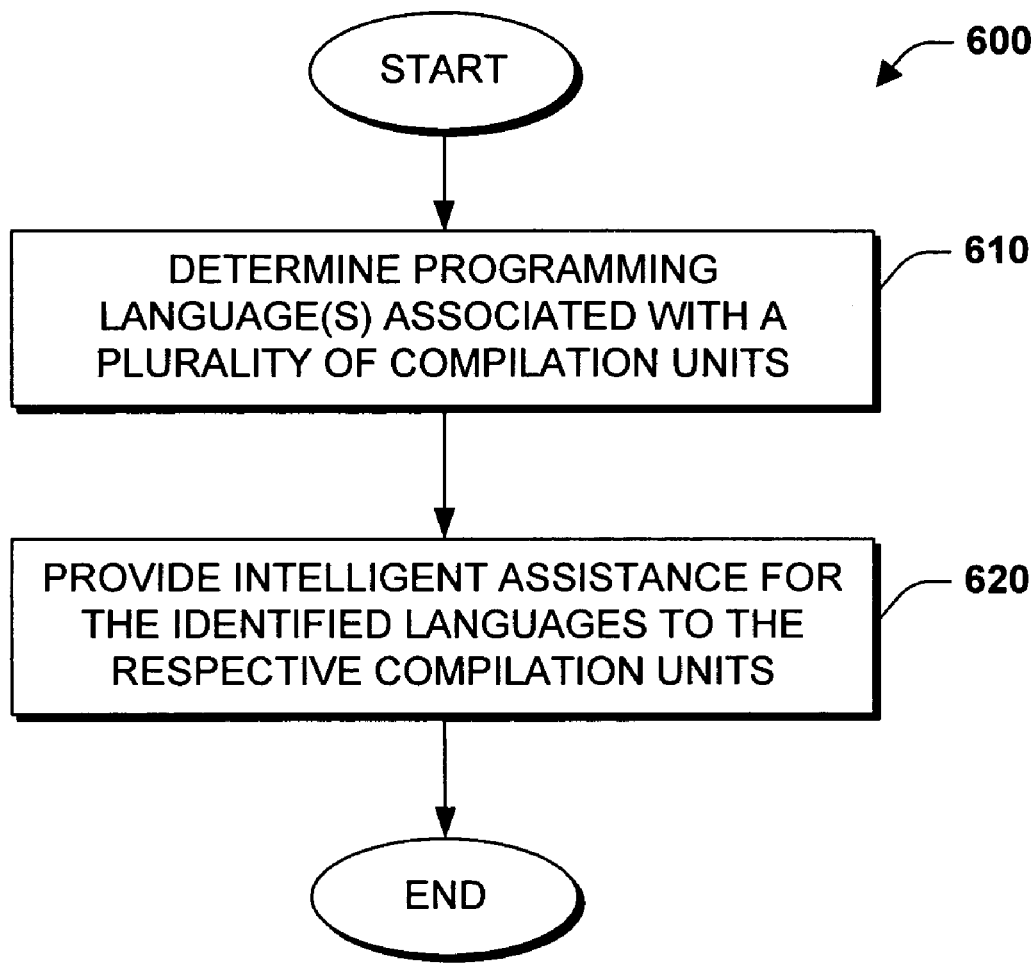
FIG. 6 is a flow chart diagram of a design time project assistance methodology in accordance with an aspect of the subject invention.
Figure 7:
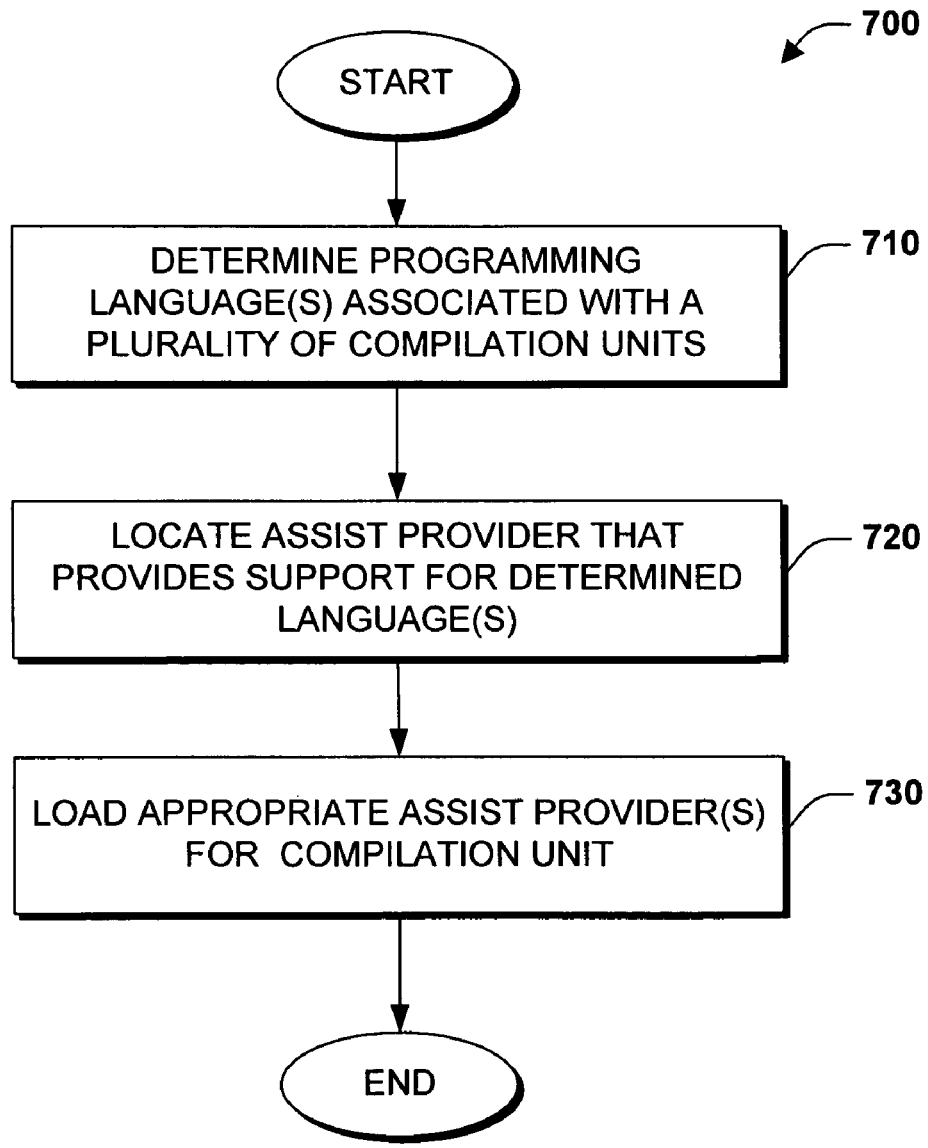
FIG. 7 is a flow chart diagram of a project coding assistance methodology in accordance with an aspect of the subject invention.
Figure 8:
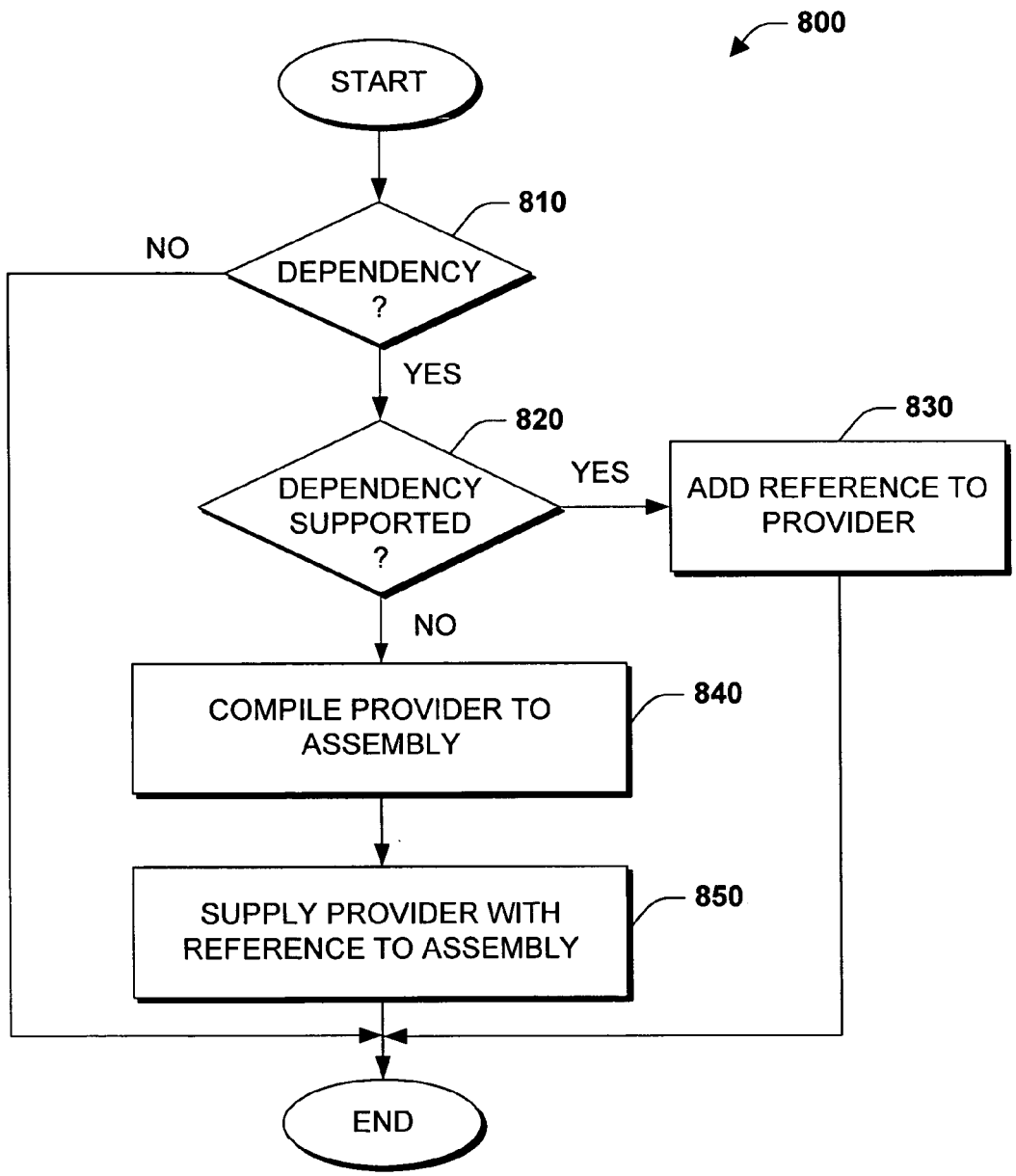
FIG. 8 is a flow chart diagram of an assist provider dependency methodology in accordance with an aspect of the subject invention.

In view of the exemplary systems described supra, a methodology that may be implemented in accordance with the present invention will be better appreciated with reference to the flow charts of FIGS. 6-8. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 6, design time project assistance methodology 600 is illustrated in accordance with an aspect of the subject invention. At 610, the programming language of a plurality of compilation units in a project system is determined. According to an aspect of the invention, a project system can correspond to a web site application. Compilation units can be programmatic units that have at least one compilation language associated therewith and can include particular compiler options and references. Thus, a single web page can be a compilation unit of a web site project comprising numerous web pages or compilation units. The language associated with a particular compilation unit can be determined in many ways. For example, such determination can be made by a compiler when the unit is compiled. In particular, language can be detected based on metadata associated with the compilation unit. Furthermore, the language can be detected from explicit declarations of such in the source code. However, it is not always necessary to wait for the file to be compiled prior to detecting the language. The language can be identified dynamically by monitoring and/or analyzing source code to detect one or more compilation languages. Once the language(s) have been detected, intelligent programmatic assistance (e.g., Intellisense®) can be provided for each compilation unit based on the language(s) associated therewith at 620. Intelligent programmatic assistance can include automated predictions or suggestions based on the code context. This can include, for instance, statement, function, or class automatic completion. Furthermore, it should be appreciated that the programmatic assistance may be provided to compilation units via a text or code editor.

FIG. 7 is a flow chart diagram of a project coding assistance methodology 700 in accordance with an aspect of the subject invention. At 710, a language for at least one compilation unit is detected. The detected language corresponds to a programming or compilation language (e.g., C++, C#, J#, Visual Basic, JAVA® . . . ). Compilation units can be programmatic units or components that have at least one compilation language associated therewith and can include particular compiler options and references. Further, the output of a compilation unit, once compiled, can be one or more specific files (e.g., dlls). According to an aspect of the subject invention, a single web page can be a compilation unit of a web site project comprising numerous web pages or compilation units. Furthermore, it should be appreciated that a portion of a web page can also correspond to a compilation unit. For example, a web page could contain several segments such as scripts written in different languages. The language associated with a particular compilation unit can be determined in several manners. For instance, such determination can be made by a compiler when the unit is compiled or partially compiled (e.g., parsed). In particular, language can be detected based on metadata associated with the compilation unit. Furthermore, the language can be detected from explicit declarations of such in the source code. However, it is not always necessary to wait for the file to be compiled prior to detecting the language. The language can be identified dynamically by monitoring and/or analyzing source code to detect one or more compilation languages. At 720, one or more assist providers are located that correspond to detected compilation languages. The assist providers are components comprising executable instructions that supply automated and language specific intelligent coding assistance (e.g., Intellisense®). Such assist components can be and are encouraged to be provided to the system to support intelligent assistance over some language domain. The assist providers can be located in many different ways. One way would be to simply ask each provider if it is compatible with a particular language or file type. This could be accomplished utilizing a project host component to interact with the assist provider via a provider interface. Alternatively, if the assist provider is registered, the registry entries could be analyzed to determine which assist provider, if any, supports the desired language. According one particular aspect of the invention, this could be achieved by matching the short language name variable with a language returned by the compiler. Once the proper assist provider(s) is located, it or an instance thereof can be loaded at 730. According to an aspect of the invention, this can consist of passing a reference (e.g., pointer) to the compilation unit to the assist provider via an interface supplied by the assist provider. Alternatively, the actual compilation unit filename(s) can be passed.

FIG. 8 depicts a flow chart diagram of an assist-provider dependency methodology 800 in accordance with an aspect of the subject invention. There may be cases where assist providers are not autonomous and depend on other assist providers or built assemblies. This may occur when one compilation unit is a web page and another is a code directory or special type of page such as a user control. Consider, for example, a first web page programmed in language X, a second web page programmed in language Y, and a middle-tier code directory programmed in language X. The first web page and the code directory may be able to be dynamically linked because they are of the same language. Such dynamic linking may not be possible with respect to the second web page and the code directory. Methodology 800 provides a process for dealing with such a scenario. In particular, some provider components may be able to be dynamically linked together providing real-time intelligent assistance. Other provider components, which cannot be linked by be forced to accept a more limited version of assistance. At 810, an initial determination is made as to whether there is a dependency relationship between providers. For example, in order for provider A to compile it must use provider B as a reference. If there is not a dependency relationship, then the procedure simply terminates. If there is a dependency relationship, the process continues at 820, where a determination is made as to whether the dependency is supported by the providers. For example, an assist provider interface can be employed to query to the at least one of the providers to determine if it supports the dependency. If the dependency is supported, then a reference is simply added to the provider at 830. In the preceding example, provider A would get a reference to provider B. At this point, the dependent providers negotiate communications amongst themselves without assistance from the project system. This is advantageous in that it will produce a kind of live intelligent assistance across compilation units. For example, if you had two web pages open that reference each other and you generate a type in one, it becomes immediately available in conjunction with intelligent assistance without otherwise saving or producing an assembly. If the dependency is not supported by the providers then the system must intervene. At 840, the referenced provider is compiled to produce an assembly thereof. The assembly is then provided to the depending component via reference, for example, at 850. In the prior example, provider B would be compiled into assembly code and given to provider A. Here, intelligent assistance can still be provided. It will just not be quite as dynamic as provider A will have to be compiled first (e.g., dynamically by saving) prior to any changes being effectuated in provider B.

Figure 9:
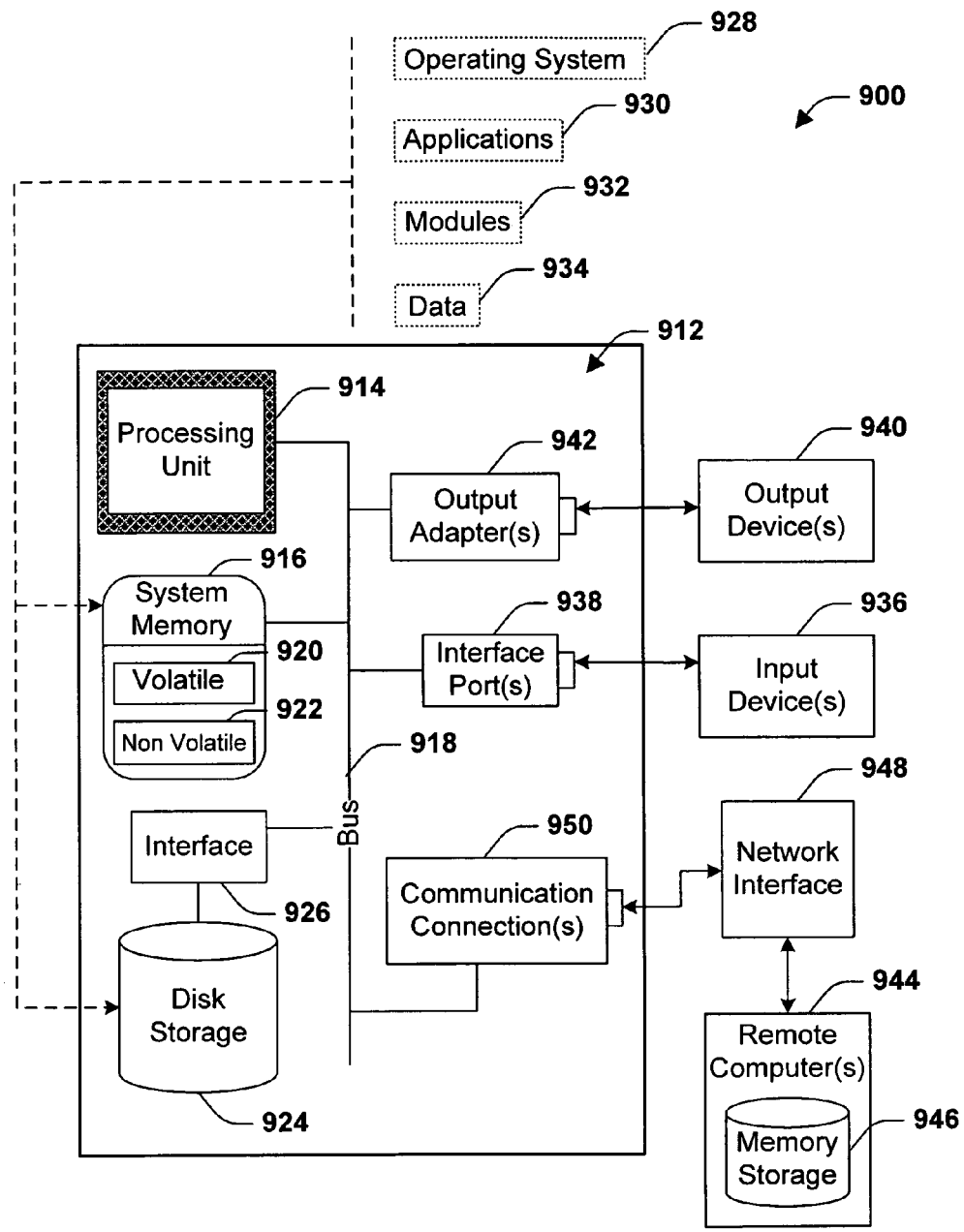
FIG. 9 is a schematic block diagram illustrating a suitable operating environment in accordance with an aspect of the present invention.
Figure 10:
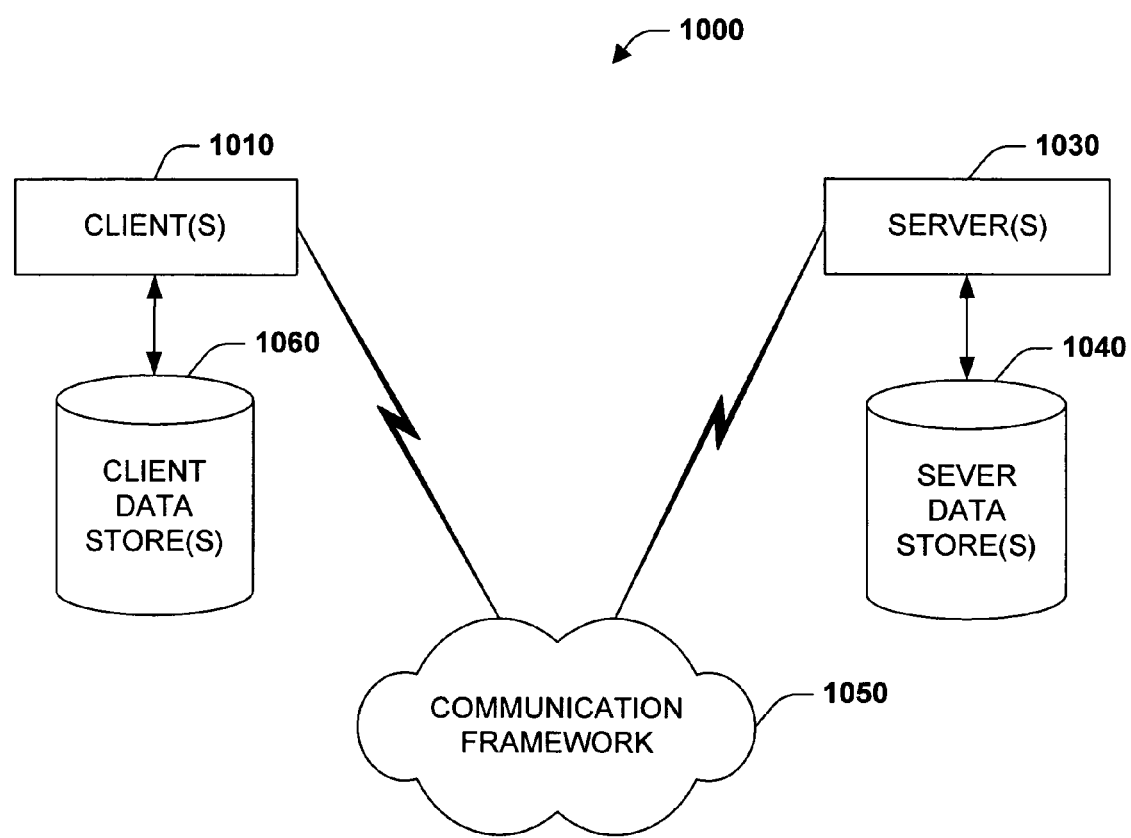
FIG. 10 is a schematic block diagram of a sample-computing environment with which the present invention can interact.

In order to provide a context for the various aspects of the invention, FIGS. 9 and 10 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example disk storage 924. Disk storage 4124 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel and CRT), speakers, and printers, among other output devices 940, that require special adapters. The output adapters 942 include, by way of illustration, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A software project development system comprising:
a computer processor that executes the following software components;
a plurality of compilation units; and
a project management system comprising a code editor component, an asynchronous component and an intelligent assist component, the project management system provides intelligent programmatic assistance to a user across a plurality of related compilation units associated with a software project;
the code editor component makes intelligent programmatic assistance available to a user during code specification;
the asynchronous component coordinates dispatch of processes requests associated with intelligent programmatic assistance to enable intelligent assistance functionality to be made available incrementally to a user and to prevent a delay in the availability or responsiveness of the code editor component; and
the intelligent assist component makes intelligent programmatic assistance provided by assist provider components available to a use, wherein the intelligent assist component includes a language detection component that identifies a compilation language employed by a program, and an assist provider detection component that detects the presence of new assist provider components and makes them available to the software project, the intelligent assist component includes one or more project host component that host assist provider components, wherein the project host component includes a project interface that can be employed by an assist provider component to retrieve project information, and assist provider component includes a provider interface that supplies an abstraction through which a project host component can communicate with an assist provider component.

2. The system of claim 1, wherein the compilation units are specified in different programming languages.

3. The system of claim 1, wherein the compilation unit is a code module.

4. The system of claim 3, wherein the code module is part of a web page implementation.

5. The system of claim 3, wherein the code module is a code directory.

6. The system of claim 1, wherein the compilation unit is a web page and the software project is a web site.

7. The system of claim 1, further comprising assist provider components that make intelligent assistance available for a particular programming language.

8. The system of claim 1, intelligent programmatic assistance includes providing users with suggestions based on program context.

9. The system of claim 1, the project management system further comprising a compilation system that dynamically compiles compilation units upon detection of one or more changes within the compilation unit.

10. The system of claim 9, wherein the compilation system detects a compilation unit language.

11. A software project development system comprising:
a computer processor that executes the following software components;
a language detection component that identifies one or more programming languages associated with a plurality of compilation units in a software project;
one or more project host components associated with the compilation units based on a language associated with the unit;
one or more assist provider components communicatively coupled to respective host components to provide automated language specific programming assistance for compilation units;

a code editor component that makes intelligent programmatic assistance available to a user during code specification;

an asynchronous component that coordinates dispatch of processes requests associated with intelligent programmatic assistance to enable intelligent assistance functionality to be made available incrementally to a user and to prevent a delay in the availability or responsiveness of the code editor component; and an intelligent assist component makes intelligent programmatic assistance provided by assist provider components available to a use, wherein the intelligent assist component includes a language detection component that identifies a compilation language employed by a program, and an assist provider detection component that detects the presence of new assist provider components and makes them available to the software project, the intelligent assist component includes one or more project host component that host assist provider components, wherein the project host component includes a project interface that can be employed by an assist provider component to retrieve project information, and assist provider component includes a provider interface that supplies an abstraction through which a project host component can communicate with an assist provider component.

12. The system of claim 11, wherein a compiler detects programming languages associated with a compilation unit.

13. The system of claim 12, wherein the compiler dynamically compiles compilation units upon a save request and detection of a change to the unit.

14. The system of claim 13, wherein the compilation units are web pages within a website project.

15. A project design system comprising:

a computer processor;

a means for identifying programming languages associated with a plurality of compilation units in a software project;

a means for providing automated language specific coding assistance to each compilation unit through a code editor;

a means for coordinating dispatch of processes requests associated with intelligent programmatic assistance to enable intelligent assistance functionality to be made available incrementally to a user and to prevent a delay in the availability or responsiveness of the code editor; and a means for making intelligent programmatic assistance provided by assist provider components available to a user, wherein the means for making intelligent programmatic assistance available includes a language detection component that identifies a compilation language employed by a program, and an assist provider detection component that detects the presence of new assist provider components and makes them available to the software project, the means for making intelligent programmatic assistance available includes one or more project host component that host assist provider components, wherein the project host component includes a project interface that can be employed by an assist provider component to retrieve project information, and the assist provider component includes a provider interface that supplies an abstraction through which a project host component can communicate with an assist provider component.

16. The system of claim 15, wherein the compilation units are web pages and the software project is a website application.

17. The system of claim 15, wherein compilation units are specified in differing programming languages.

18. A method of providing programming assistance comprising:

detecting a language associated with at least one compilation unit of a software project;

providing automated intelligent programmatic assistance to the compilation unit through a code editor;

coordinating dispatch of processes requests associated with intelligent programmatic assistance to enable intelligent assistance functionality to be made available incrementally to a user and to prevent a delay in the availability or responsiveness of the code editor;

making intelligent programmatic assistance provided by assist provider components available to a user, wherein making intelligent programmatic assistance available includes identifying a compilation language employed by a program, and detecting the presence of new assist provider components and making them available to the software project; and providing one or more project host component that host assist provider components, wherein the project host component includes a project interface that can be employed by to retrieve project information, and the assist provider component includes a provider interface that supplies an abstraction through which a project host component can communicate with an assist provider component.

19. The method of claim 18, wherein the language is detected by a compiler based on one or more of compilation unit metadata and explicit language declarations.

20. The method of claim 18, wherein the language is detected by dynamically analyzing unit source code.

21. The method of claim 18, wherein the compilation unit is a web page and the project is a website including numerous web pages.

22. The method of claim 18, wherein the compilation unit is a middle-tier code directory.

23. A software project assistance methodology comprising:

detecting a project compilation unit language;

locating an assist provider that supports the compilation unit language;

loading the assist provider;

providing automated intelligent programmatic assistance to the compilation unit language through a code editor;

coordinating dispatch of processes requests associated with intelligent programmatic assistance to enable intelligent assistance functionally to be made available incrementally to a user and to prevent a delay in the availability or responsiveness of the code editor;

making intelligent programmatic assistance provided by assist provider components available to a user, wherein making intelligent programmatic assistance available includes identifying a compilation language employed by a program, and detecting the presence of new assist provider components and making them available to the software project; and providing one or more project host component that host assist provider components, wherein the project host component includes a project interface that can be employed by to retrieve project information, and the assist provider component includes a provider interface that supplies an abstraction through which a project host component can communicate with an assist provider component.

24. The method of claim 23, wherein locating the assist provider comprises employing an assist provider interface to query whether the provider supports a particular language.

25. The method of claim 23, wherein locating the assist component comprises analyzing registry entries to determine which assist provider supports the desired language.

26. The method of claim 23, wherein loading an assist provider comprises providing the assist component with a reference to the compilation unit via an assist provider interface.

* * * * *